US011589134B2

(12) United States Patent
Moscirella et al.

(10) Patent No.: US 11,589,134 B2
(45) Date of Patent: Feb. 21, 2023

(54) NARROWCASTING TO ONE-WAY SET TOP BOXES

(71) Applicant: ARRIS Enterprises LLC, Suwanee, GA (US)

(72) Inventors: Steven J. Moscirella, Collegeville, PA (US); Robert Mack, Collegeville, PA (US); Michael Labouliere, Pipersville, PA (US); Roger Gahman, Telford, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/514,808

(22) Filed: Oct. 29, 2021

(65) Prior Publication Data

US 2022/0141544 A1    May 5, 2022

Related U.S. Application Data

(60) Provisional application No. 63/107,649, filed on Oct. 30, 2020.

(51) Int. Cl.
*H04N 7/173* (2011.01)
*H04N 21/6408* (2011.01)
*H04N 21/647* (2011.01)
*H04N 21/6338* (2011.01)

(52) U.S. Cl.
CPC ..... *H04N 21/6408* (2013.01); *H04N 21/6338* (2013.01); *H04N 21/64784* (2013.01)

(58) Field of Classification Search
CPC .......... H04N 21/6408; H04N 21/6338; H04N 21/64784
See application file for complete search history.

(56) References Cited

U.S. PATENT DOCUMENTS

| | | | | |
|---|---|---|---|---|
| 7,451,475 B1 * | 11/2008 | Oz | ......................... | H04L 69/04 375/E7.277 |
| 8,739,233 B2 * | 5/2014 | Schlack | ............. | H04N 21/6405 725/90 |
| 2009/0265733 A1 * | 10/2009 | McKelvey | ........... | H04N 21/812 725/32 |
| 2012/0163593 A1 * | 6/2012 | Lejeune | ........... | H04N 21/23476 380/200 |

* cited by examiner

*Primary Examiner* — Mulugeta Mengesha
(74) *Attorney, Agent, or Firm* — Chernoff, Vilhauer, McClung & Stenzel, LLP

(57) ABSTRACT

Methods and systems of narrowcasting to a service group having one or more one-way set top boxes are shown and disclosed. The method may include receiving encrypted single program transport streams (SPTSs) from an encryptor, and receiving one or more session control signals for the SPTSs from a switched digital video (SDV) control system. The method may additionally include receiving service information (SI) packet identifiers (PIDs) for the SPTSs from a conditional access (CA) system, and updating the SI PIDs based on the one or more session control signals. The method may further include converting the SPTSs to narrowcast multiprogram transport streams (MPTSs) based on the one or more session control signals, and transmitting the narrowcast MPTSs and the updated SI PIDs to a plurality of edge quadrature amplitude modulation (QAM) devices.

19 Claims, 4 Drawing Sheets

NARROWCASTING TO ONE-WAY SET TOP BOXES

CROSS REFERENCE TO RELATED APPLICATIONS

This application claims the benefit of U.S. Provisional Patent Application No. 63/107,649 filed Oct. 30, 2020.

BACKGROUND

The subject matter of this application relates to narrowcasting using switched digital video systems to service groups having one or more one-way set top boxes.

To reclaim quadrature amplitude modulation (QAM) bandwidth, cable operators have been migrating a portion of their linear broadcast services to switched broadcast services using one of several switched digital video (SDV) systems. Because of its many benefits, cable operators would like to transition to an all switched broadcast SDV system. The benefits of an all switched broadcast SDV system include (1) service channel line-up changes can be performed without re-configuring edge QAMs (EQAMs), (2) QAM usage can vary across a region such that operators can tailor QAM frequencies and quantities on a per service group; and (3) the number of channel maps can be reduced such that operators do not need to create channel maps to handle different frequency usage across different locations.

Delivering broadcast services via an SDV system requires two-way set top boxes that can communicate with the SDV system and thus does not work with one-way set top boxes that are not capable of communicating with the SDV system. One-way set top boxes need to communicate with the SDV system to identify tuner changes and to identify an active switched service. Additionally, the one-way set top boxes do not have the proper SDV client code that understands the SDV in-band mini-carousel identifying the tuning parameters of the active switched service. What is desired, therefore, is a way to support one-way set top boxes in an all switched broadcast SDV system.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
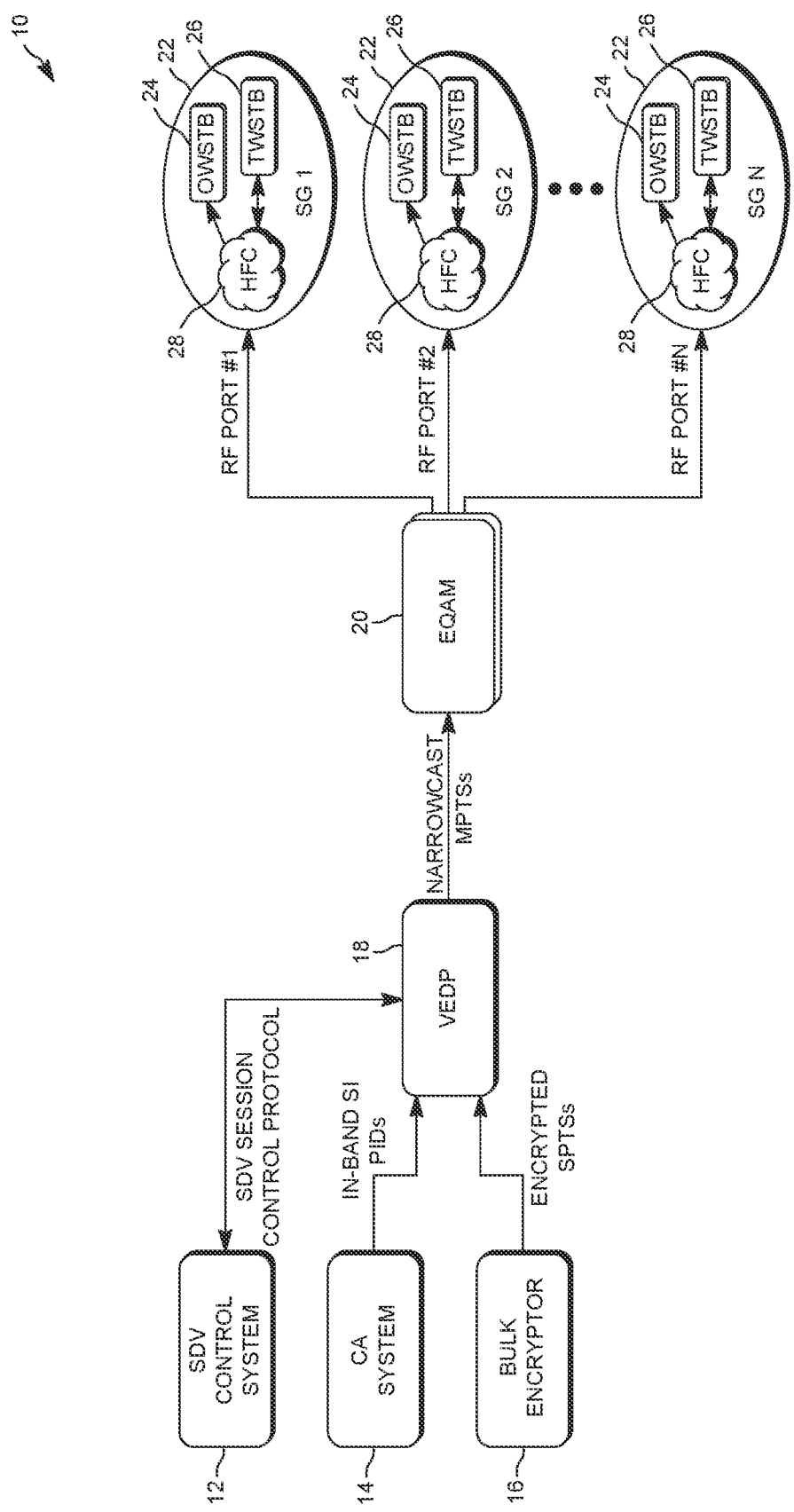
FIG. 1 is a high-level block diagram of an example of a SDV system.

Referring to FIG. 1, an illustrative example of a SDV system 10 is shown. The SDV system includes a SDV control system 12, a conditional access (CA) system 14, a bulk encryptor 16, a virtual edge device proxy (VEDP) 18, an edge device having a plurality of edge QAM modulators (EQAMs) 20, and a plurality of service groups 22. Each service group includes one-way set top boxes 24 and two-way set top boxes 26 that communicate with EQAMs 22 via one or more hybrid fiber co-axial (HFC) networks 28.

SDV control system 12 communicates with VEDP 18 via any suitable SDV session control protocol, such as the next generation on demand (NGOD) protocol. The SDV control system may include, for example, a management console, a SDV session manager, and/or an edge manager. CA system 14 provides conditional access information to VEDP 18. Additionally, CA system 14 provides system information (SI) packet identifiers (PIDs), such as in-band SI PIDs, to the VEDP to support one-way set top boxes. CA system 14 may include a Digital Addressable Controller (DAC). Bulk encryptor 16 provides encrypted single program transport streams (SPTSs) to VEDP 18.

VEDP 18 is a universal proxy for EQAMs 20 supporting video narrowcast QAMs. The VEDP communicates with SDV control system 12 on behalf of EQAMs 20 and builds appropriate multiprogram transport services (MPTSs) from the encrypted SPTSs from bulk encryptor 16 for each narrowcast video QAM defined within EQAMs 20. Additionally, VEDP 18 switches in dynamic broadcast services as controlled or commanded by SDV control system 12. Moreover, VEDP 18 receives SI PIDs (e.g., in-band SI PIDs) from CA system 14 and inserts and fixes those SI PIDs such that one-way set top boxes 24 can operate properly. For example, VEDP 18 delivers SI PIDs that are aligned with where the SDV system places those services available to the one-way set top boxes. The SI PIDs generally are in-band SI PIDs, but out-of-band SI PIDs also are within the scope of the present disclosure. Additionally, VEDP 18 configures the QAM channels containing services targeted to the one-way set top boxes to route the updated SI PIDs. The VEDP ensures that all QAM channels with the same narrowcast service group contains the same set of SI PIDs.

EQAMs 20 receives the narrowcast MPTSs and narrowcasts the MPTSs to service groups 22. The EQAMs include a plurality of radio frequency (RF) ports 30 that are connected to HFC network(s) 28. Service groups 22 include a plurality of one-way set top boxes 24 (e.g., digital television adapters) and two-way set top boxes 26.

One-way set top boxes 24 are incapable of notifying SDV control system 12 of active tuned services so SDV control system 12 must manage any service intended for one-way set top boxes 24 to always remain active and not switch out any service targeted for those set top boxes. In other words, the services provided to one-way set top boxes 24 are static or always available. However, SDV control system 12 can still manage whether to place the above services so the placement of services in a QAM is still dynamically assigned by the SDV control system. However, the above services remain permanently active regardless of whether any two-way set top box 26 is actively tuned to the services.

Figure 2:
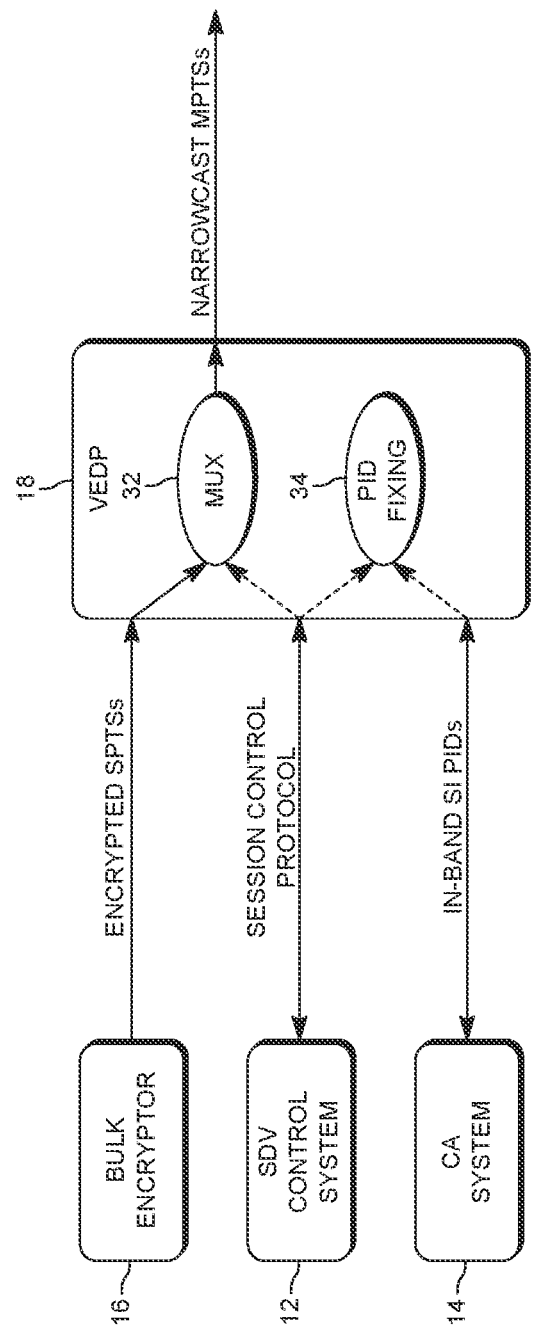
FIG. 2 is partial block diagram of the SDV system of FIG. 1.

Referring to FIG. 2, the interactions of VEDP 18 with other components of SDV system 10 are shown. VEDP 18 includes a multiplexer (MUX) 32 and a PID update or fixing component 34. MUX 32 receives encrypted SPTSs from bulk encryptor 16, such as via user datagram protocol (UDP), internet protocol (IP), and/or 10 gigabit Ethernet (10 GigE). In some embodiments, MUX 32 multiplexes SDV and video on demand (VOD) services. Additionally, MUX 32 and/or PID fixing component 34 communicate with SDV control system 12 via any suitable session control protocol, such as NGOD R6 (discovery) and D6 (resource management) protocols. For example, SDV control system 12 can use the NGOD R6 protocol to set up sessions on VEDP 18 and to signal which MPTSs (e.g., virtual QAMs) are to route which services.

As part of the session set-up, SDV control system 12 includes a source ID that uniquely identifies the services being routed. The source ID is also used to identify services within the SI PIDs. For example, PID fixing component 34 uses the source ID to fix and/or update service information in the SI PIDs. When one-way set top boxes 24 are digital television adapters (DTAs), the in-band service information is contained in the network PID. SDV control system 12 may provide additional information to MUX 32 and/or PID fixing component 34, such as frequency and/or moving pictures expert group (MPEG) program number (PN), etc.

CA system 14 provides SI PIDs to PID fixing component 34, such as via user datagram protocol (UDP), internet protocol (IP), and/or 10 gigabit Ethernet (10 GigE). The SI PIDs may include a conditional access table (CAT), entitlement management message (EMM), network (NET) PID, electronic program guide (EPC), and set top box code download (CDL). The CAT includes information that is used by the set top boxes to decode the narrowcasted streams. The EMM defines access rights for each set top box and may be sent continuously to allow the set top boxes to continue to decode the narrowcasted streams as the encryption changes for those streams. The EPC are menu-based systems that provide the set top boxes with continuously updated menus that display scheduling information for current and upcoming programs. When one-way set top boxes 24 are DTAs, an example of in-band SI PIDs is shown in Table 1 below.

CAT (PID 1, 1 per EMM)
EMM (PID X, 1 per DAC)
NET (PID Y, 1+ per DAC)
EPG (PID Z, 1+ per DAC)
CDL (PID W, 1+ per DAC)

Table 1: In-Band DTA PIDs

PID fixing component 34 fixes or updates the virtual channel message (VCM) in the SI PIDs, such as by updating the tuning parameters to correspond to where SDV control system 12 placed each service for one-way set top boxes 24. In some embodiments, the VCM includes portions of a virtual channel table (VCT) and/or inverse channel table (ICT). The updated VCM allows one-way set top boxes 24, such as digital television adapters, to tune to switched broadcast services using the SI PIDs. The VCM messages contained in the SI PIDs identifies the QAM channel information and program number of each one-way set top box service in a virtual channel record. Because both the QAM channel information and program numbers can change from what is defined by CA system 14, PID fixing component 34 must correct or update the QAM channel information and/program numbers in the VCM based on where SDV control system 12 routes the one-way set top box services within the narrowcast MPTSs.

For each one-way set top box service contained in the input VCM that corresponds to an active SDV session within a narrowcast service group, PID fixing component 34 modifies the QAM channel information and program number. The QAM channel information includes a reference to a carrier definition sub-table (CDS) entry and a modulation mode sub-table (MMS). If SDV control system 12 has not routed a one-way set top box service contained in the input VCM, PID fixing component 34 removes the corresponding virtual channel record from the output VCM to prevent a one-way set top box from tuning to a wrong service. Whenever a SDV session for a one-way set top box is established or removed, PID fixing component 34 updates the VCM to reflect the updating routing. Additionally, when the input VCM changes, PID fixing component 34 updates the output channel with those changes.

The SI PIDs, such as the network PID, may contain VCMs for multiple channel maps (VCM with different VCT IDs) where a given channel map may span multiple VCMs. PID fixing component 34 updates all VCMs the same for all VCMs targeted to the same narrowcast service group. In other words, PID fixing component 34 makes the same updates to the VCMs that are for the same service group. Each narrowcast service group can have its own channel map.

Additionally, PID fixing component 34 fixes or updates the code version table (CVT) message within the SI PIDs, such as by updating the frequency in the CVT to match the MPTSs where a code download (CDL) was provisioned so that one-way set top boxes 24 can download new code releases. The CVT references the frequency and PID of each one-way set top box code download stream. A code download stream may include multiple code objects (e.g., code objects for multiple one-way set top box models). The SI PIDs may include a single code download PID or multiple code download PIDs. In some embodiments, an operator manually configures code download PID(s) on the PID fixing component 34 and that component corrects the frequency in all CVT messages included in the stream. PID fixing component 34 can uniquely identify each code download PID using, for example, the PID number. Moreover, PID fixing component 34 fixes or updates the program association table (PAT) of each narrowcast MPTS to identify the PID number of the SI PIDs, such as by updating service number 0 with the SI PIDs.

An example of operations of VEDP 18 for DTAs is shown in Table 2 below. VEDP 18 outputs narrowcast MPTSs to EQAMs 20, such as via user datagram protocol (UDP), internet protocol (IP), and/or 10 gigabit Ethernet (10 GigE).

Figure 3:
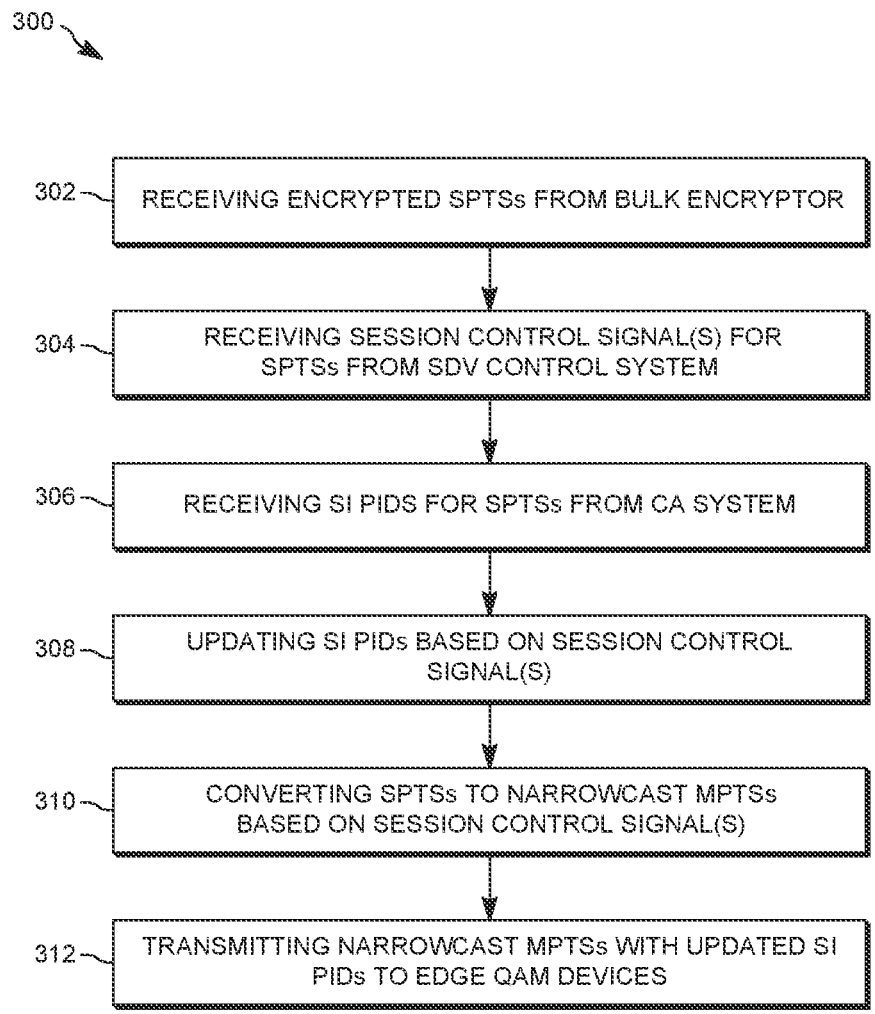
FIG. 3 is a flowchart showing an example of a method of narrowcasting to one or more service groups having one or more one-way set top boxes with the SDV system of FIGS. 1-2.

Mux SDV/VOD services per R6 session set up
Insert DTA in-band PIDs per manual configuration
Update Network PID: fix frequency/PN in VCM to match session set up
Update Network PID: fix frequency in CVT to match QAM with CDL
Update SN 0 in PAT Table 2: VEDP Operations Referring to FIG. 3, an example of methods 300 for narrowcasting to a service group having one or more set top boxes is shown. At 302, encrypted single program transport streams (SPTSs) are received from a bulk encryptor, such as via user datagram protocol (UDP), internet protocol (IP), and/or 10 gigabit Ethernet (10 GigE). At 304, one or more session control signals for the SPTSs are received from a switched digital video (SDV) control system. At 306, service information (SI) packet identifiers (PIDs) (e.g., in-band SI PIDs) for the SPTSs are received from a conditional access (CA) system, such as via user datagram protocol (UDP), internet protocol (IP), and/or 10 gigabit Ethernet (10 GigE).

At 308, the SI PIDs are updated based on the one or more session control signals. For example, one or more tuning parameters in a virtual channel message (VCM) in the SI PIDs may be updated to correspond to one or more edge QAM devices that are providing the narrowcast MPTSs for one or more one-way set top boxes. The above updates may include updating QAM channel information and program number in the VCM to correspond to one or more edge QAM devices that are providing the narrowcast MPTSs for one or more one-way set top boxes. The VCM may be updated when a SDV session for the one or more one-way set top boxes is established or removed. Additionally, the same updates may be made to all VCMs for each service group.

Moreover, the above updates may include updating a code version table (CVT) message within the SI PIDs, such as updating frequency in the CVT message to match the narrowcast MPTSs when a code download (CDL) PID was provisioned. Furthermore, the above updates may include updating a program association table (PAT) of each of the narrowcast MPTSs and/or updating frequency in the CVT messages of one or more code download streams for one or more of the one-way set top boxes.

At 310, the SPTSs are converted to narrowcast multiprogram transport streams (MPTSs) based on the one or more session control signals. At 312, the narrowcast MPTSs and the updated SI PIDs are transmitted to a plurality of edge quadrature amplitude modulation (QAM) devices for narrowcasting to the different service groups. Although particular steps are shown FIG. 3, other examples of the method may add, omit, modify, or substitute one or more steps. Additionally, other examples of the method may have a different order or sequence of steps instead of the particular sequence of steps shown in FIG. 3.

Figure 4:
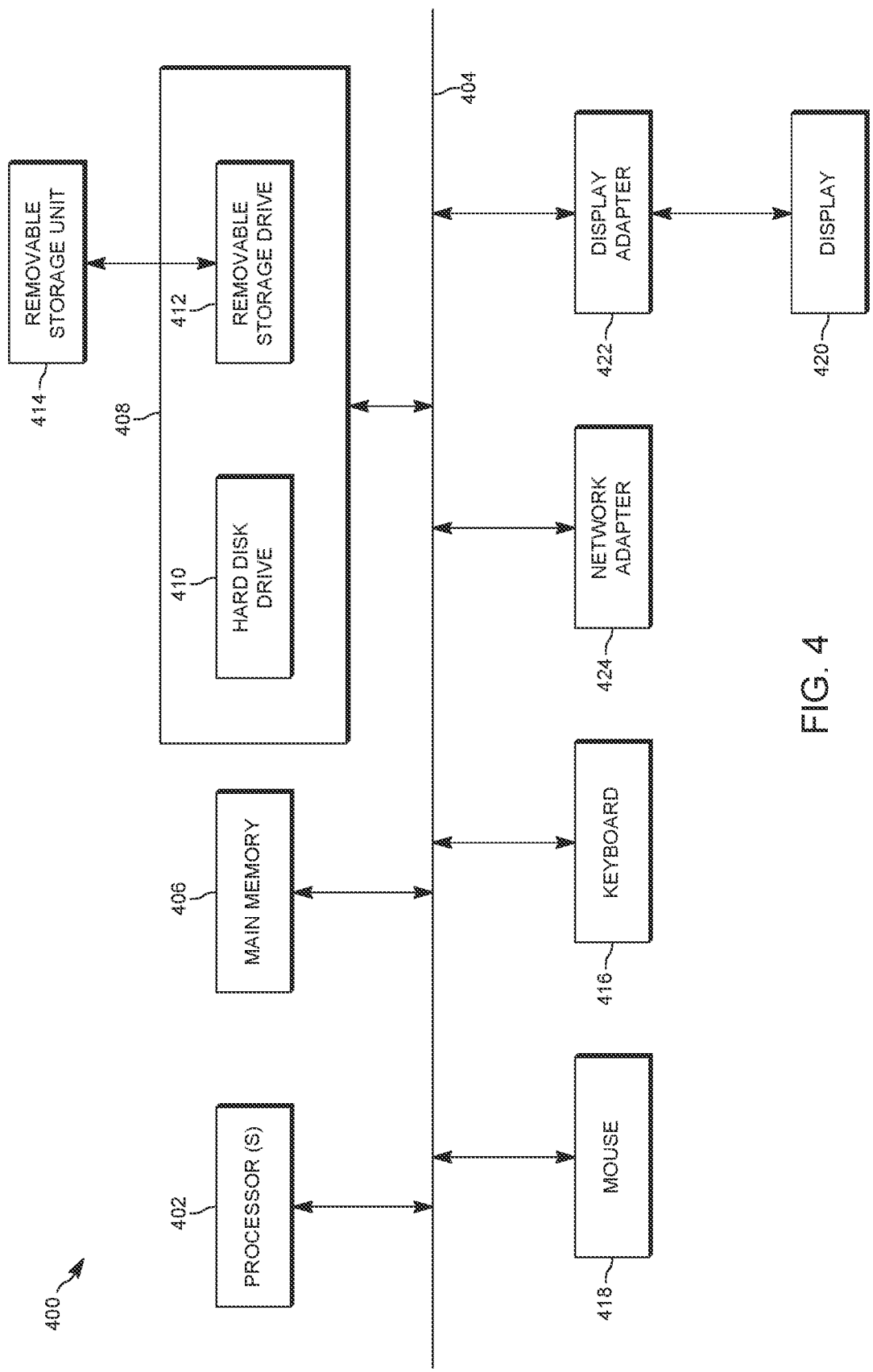
FIG. 4 is a block diagram of an example of a computing apparatus that may be configured to implement or execute one or more of the processes performed by any of the various devices described herein.

Referring to FIG. 4, a block diagram of an example of a computing apparatus 400 is shown. The computing apparatus may be configured to implement or execute one or more of the processes performed by any of the various devices shown herein, including the VEDP, MUX, PID fixing component, set top box(es), the session manager(s), the edge manager(s), the edge device(s), the management console(s), etc. of the present disclosure. The illustration of the computing apparatus 400 is a generalized illustration and that the computing apparatus 400 may include additional components and that some of the components described may be removed and/or modified without departing from a scope of the computing apparatus 400.

The computing apparatus 400 includes a processor 402 that may implement or execute some or all of the steps described in the methods described herein. Commands and data from the processor 402 are communicated over a communication bus 404. The computing apparatus 400 also includes a main memory 406, such as a random access memory (RAM), where the program code for the processor 402, may be executed during runtime, and a secondary memory 408. The secondary memory 408 includes, for example, one or more hard disk drives 410 and/or a removable storage drive 412, where a copy of the program code for one or more of the processes depicted in FIGS. 2-5 may be stored. The removable storage drive 412 reads from and/or writes to a removable storage unit 414 in a well-known manner.

As disclosed herein, the term "memory," "memory unit," "storage drive or unit" or the like may represent one or more devices for storing data, including read-only memory (ROM), random access memory (RAM), magnetic RAM, core memory, magnetic disk storage mediums, optical storage mediums, flash memory devices, or other computer-readable storage media for storing information. The term "computer-readable storage medium" includes portable or fixed storage devices, optical storage devices, a SIM card, other smart cards, and various other mediums capable of storing, containing, or carrying instructions or data. However, computer readable storage media do not include transitory forms of storage such as propagating signals, for example.

User input and output devices may include a keyboard 416, a mouse 418, and a display 420. A display adaptor 422 may interface with the communication bus 404 and the display 420 and may receive display data from the processor 402 and convert the display data into display commands for the display 420. In addition, the processor(s) 402 may communicate over a network, for instance, the Internet, LAN, etc., through a network adaptor 424.

The systems and methods of the present disclosure supports proper handling of one-way set top boxes in an all switched broadcast SDV system across any type of deployed video EQAM devices. Additionally, the systems and methods of the present disclosure eliminates the need to modify one-way set top box clients across multiple platforms as well as to modify EQAM devices to support fixing SI PIDs. Moreover, the systems and methods of the present disclosure allows operators to move around services targeted to one-way set top boxes to reclaim QAM bandwidth.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method for narrowcasting to one or more service groups having one or more one-way set top boxes, comprising:
    (a) receiving encrypted single program transport streams (SPTSs) from an encryptor;
    (b) receiving one or more session control signals for the SPTSs from a switched digital video (SDV) control system;
    (c) receiving service information (SI) packet identifiers (PIDs) for the SPTSs from a conditional access (CA) system;
    (d) updating the SI PIDs based on the one or more session control signals;
    (e) converting the SPTSs to narrowcast multiprogram transport streams (MPTSs) based on the one or more session control signals; and
    (f) transmitting the narrowcast MPTSs and the updated SI PIDs to a plurality of edge quadrature amplitude modulation (QAM) devices.

2. The method of claim 1, wherein receiving service information (SI) packet identifiers (PIDs) for the SPTSs includes receiving in-band SI PIDs, and wherein updating the SI PIDs based on the one or more session control signals includes updating the in-band SI PIDs based on the one or more session control signals.

3. The method of claim 1, wherein updating the SI PIDs based on the one or more session control signals includes updating one or more tuning parameters in a virtual channel message (VCM) in the SI PIDs to correspond to one or more edge QAM devices that are providing the narrowcast MPTSs for the one or more one-way set top boxes.

4. The method of claim 3, wherein updating one or more tuning parameters to correspond to one or more edge QAM devices that are providing the narrowcast MPTSs for the one or more one-way set top boxes includes updating QAM channel information and program number in the VCM to correspond to one or more edge QAM devices that are providing the narrowcast MPTSs for the one or more one-way set top boxes.

5. The method of claim 4, wherein updating QAM channel information and program number in the VCM to correspond to one or more edge QAM devices that are providing the narrowcast MPTSs for the one or more one-way set top boxes includes updating the VCM when a SDV session for the one or more one-way set top boxes is established or removed.

6. The method of claim 3, wherein updating one or more tuning parameters to correspond to one or more edge QAM devices that are providing the narrowcast MPTSs for the one or more one-way set top boxes includes providing the same update to all VCMs in the SI PIDs for each service group of the one or more service groups.

7. The method of claim 1, wherein updating the SI PIDs based on the one or more session control signals includes updating a code version table (CVT) message within the SI PIDs.

8. The method of claim 7, wherein updating a code version table (CVT) within the SI PIDs includes updating frequency in the CVT to match the narrowcast MPTSs when a code download (CDL) PID was provisioned.

9. The method of claim 1, wherein updating the SI PIDs based on the one or more session control signals includes updating a program association table (PAT) of each of the narrowcast MPTSs.

10. The method of claim 1, wherein updating the SI PIDs based on the one or more session control signals includes updating frequency in code version table (CVT) messages of one or more code download streams for the one or more one-way set top boxes.

11. A switched digital video (SDV) system for one or more service groups having one or more one-way set top boxes, comprising virtual edge device proxy (VEDP) module including at least one processor and at least one memory having a tangible, non-transitory computer-readable medium, the VEDP module performing the steps comprising:

receiving encrypted single program transport streams (SPTSs) from an encryptor;

receiving one or more session control signals for the SPTSs from a switched digital video (SDV) control system;

receiving in-band service information (SI) packet identifiers (PIDs) for the SPTSs from a conditional access (CA) system;

updating the in-band SI PIDs based on the one or more session control signals;

converting the SPTSs to narrowcast multiprogram transport streams (MPTSs) based on the one or more session control signals; and transmitting the narrowcast MPTSs and the updated in-band SI PIDs to a plurality of edge quadrature amplitude modulation (QAM) devices.

12. The SDV system of claim 11, wherein the VEDP further performs the step of updating one or more tuning parameters in a virtual channel message (VCM) in the in-band SI PIDs to correspond to one or more edge QAM devices that are providing the narrowcast MPTSs for the one or more one-way set top boxes.

13. The SDV system of claim 12, wherein the VEDP further performs the step of updating QAM channel information and program number in the VCM to correspond to one or more edge QAM devices that are providing the narrowcast MPTSs for the one or more one-way set top boxes.

14. The SDV system of claim 13, wherein the VEDP further performs the step of updating the VCM when a SDV session for the one or more one-way set top boxes is established or removed.

15. The SDV system of claim 12, wherein the VEDP further performs the step of providing the same update to all VCMs in the in-band SI PIDs for each service group of the one or more service groups.

16. The SDV system of claim 11, wherein the VEDP further performs the step of updating a code version table (CVT) message within the in-band SI PIDs.

17. The SDV system of claim 11, wherein the VEDP further performs the step of updating frequency in the CVT to match the narrowcast MPTSs when a code download (CDL) PID was provisioned.

18. The SDV system of claim 11, wherein the VEDP further performs the step of updating a program association table (PAT) of each of the narrowcast MPTSs.

19. The SDV system of claim 11, wherein the VEDP further performs the step of updating frequency in code version table (CVT) messages of one or more code download streams for the one or more one-way set top boxes.

* * * * *